(12) United States Patent
Lewis et al.

(10) Patent No.: US 6,736,864 B1
(45) Date of Patent: May 18, 2004

(54) REACTIVE DYE COMPOUNDS

(75) Inventors: David Malcolm Lewis, Otley (GB); Dong Wei He, Leeds (GB); Taher Iqbal Yousaf, Egham (GB); Gilles Yves Marie Fernand Genain, London (GB)

(73) Assignee: North Carolina State University, Raleigh, NC (US)

( * ) Notice: Subject to any disclaimer, the term of this patent is extended or adjusted under 35 U.S.C. 154(b) by 0 days.

(21) Appl. No.: 10/089,334

(22) PCT Filed: Sep. 29, 2000

(86) PCT No.: PCT/US00/26911
§ 371 (c)(1),
(2), (4) Date: Mar. 27, 2002

(87) PCT Pub. No.: WO01/25336
PCT Pub. Date: Apr. 12, 2001

(30) Foreign Application Priority Data

Oct. 1, 1999 (GB) .............................................. 9923332

(51) Int. Cl.$^7$ ........................... D06P 1/382; D06P 1/384
(52) U.S. Cl. ...................... 8/549; 8/405; 8/428; 8/436; 8/437; 8/598; 8/917; 8/918; 8/924
(58) Field of Search .................... 8/543, 549, 918–924, 8/405, 428, 436, 437, 598, 917

(56) References Cited

U.S. PATENT DOCUMENTS

| | | |
|---|---|---|
| 3,116,275 A | 12/1963 | Gamlen et al. |
| 3,377,336 A | 4/1968 | Siegel et al. |
| 3,433,781 A | 3/1969 | Ackerman et al. |
| 3,522,246 A | 7/1970 | Siegel et al. |
| 3,527,760 A | 9/1970 | Siegel et al. |
| 3,663,576 A * | 5/1972 | Meininger et al. |
| 3,873,513 A | 3/1975 | Kullman et al. |
| 4,092,478 A | 5/1978 | Plant et al. |
| 4,098,784 A | 7/1978 | Swidler et al. |
| 4,139,345 A | 2/1979 | Crabtree et al. |
| 4,150,021 A | 4/1979 | Swidler et al. |
| 4,832,698 A | 5/1989 | Ikeou et al. |
| 4,855,411 A | 8/1989 | Thompson et al. |
| 4,898,933 A | 2/1990 | Schläfer et al. |
| 5,037,449 A | 8/1991 | Hoegerle et al. |
| 5,175,263 A | 12/1992 | Schläfer |
| 5,548,071 A | 8/1996 | Deitz et al. |
| 5,766,267 A | 6/1998 | Schumacher et al. |
| 5,877,310 A | 3/1999 | Reddington et al. |
| 6,350,862 B1 | 2/2002 | Brock et al. |
| 6,398,822 B1 | 6/2002 | Brock et al. |

FOREIGN PATENT DOCUMENTS

| | | |
|---|---|---|
| CA | 771632 | 11/1967 |
| DE | 33 35 956 A1 | 4/1985 |
| DE | 196 45 601 A | 5/1998 |
| EP | 0 260 806 A2 | 3/1988 |
| EP | 0 735 107 A2 | 9/1990 |
| EP | 0 418 623 A1 | 3/1991 |
| FR | 1 274 732 A | 2/1962 |
| GB | 949 316 A | 2/1964 |
| GB | 1 020 304 | 2/1966 |
| GB | 1 060 734 | 3/1967 |
| GB | 1 275 944 | 6/1972 |
| GB | 1 414 420 A | 11/1975 |
| JP | 60 208 367 | 10/1985 |
| JP | 63 006 181 | 1/1988 |
| WO | WO-96/02593 | 2/1996 |
| WO | WO 97 19188 A | 5/1997 |
| WO | WO 99/51685 | 10/1999 |
| WO | WO 99/51686 | 10/1999 |
| WO | WO 99/51689 | 10/1999 |
| WO | WO 00/69973 | 11/2000 |
| WO | WO 00/69974 | 11/2000 |
| WO | WO 01/25337 | 4/2001 |
| WO | WO 01/25338 | 4/2001 |
| WO | WO 01/25339 | 4/2001 |

OTHER PUBLICATIONS

Grabtchev, "The synthesis and Properties of some Traizine stilbene Fluorescent Brighteners," Dyes Pigm., 1994, pp. 249–254 25.*

The Journal of Macromolecular Chemistry, 1976, 50, pp. 1–8, 728.

The Journal of Macromolecular Chemistry, 1977, 64, pp. 205–210, 951.

S. Horrobin, "The Hydrolysis of Some Chloro–1,3,5–Triazines", The Journal of the Chemical Society, 1963, pp. 4130–4144.

F. Lehr, "Synthesis and Application of Reactive Dyes with Heterocyclic Reactive Systems," Jan. 19, 1990, pp. 239–263.

* cited by examiner

*Primary Examiner*—Margaret Einsmann
(74) *Attorney, Agent, or Firm*—Jenkins, Wilson & Taylor, P.A.

(57) ABSTRACT

A reactive dye compound comprising: (a) at least one chromophore moiety; (b) at least one SO2C2H4 group which is attached to the chromphore moiety either directly via the sulphur atom of the SO2C2H4 group or via a linking group L; characterized in that at least one SO2C2H4 group is substituted on its terminal carbon atom with at least one Y group wherein Y is a phosphonate or borate derivative. The compounds herein high Exhaustion Values (E), high Fixation Values (F) and high Efficiency Values (T) and show significant improvements in terms of reducing spent dyestuff in effluent, increasing dye affinity to the substrate, increasing the dye-substrate covalent bonding, increasing the ability to dye substrates at room temperature, decreasing the amount of dye that is removed during the post dyeing "soaping off process" and therefore simplifying the post dyeing "soaping off process" and therefore simplifying the post dyeing "soaping off process" traditionally associated with dyeing cotton with fibre reactive dyes and reduction of staining of adjacent white fabrics. In addition, the compounds prepared above provided more intense dyeings and require less levels of salt for dyeing cotton substrates.

20 Claims, No Drawings

REACTIVE DYE COMPOUNDS

TECHNICAL FIELD

The present invention relates to reactive dye compounds. In particular the present invention relates to reactive dye compounds having improved dye-bath Exhaustion (E) and improved dye-fibre covalent Fixation (F).

BACKGROUND OF THE INVENTION

Reactive dye compounds are known in the art for dyeing various substrates. Such substrates include for example proteinaceous materials such as keratin, e.g. found in hair, skin and nails and various animal body parts such as homs, hooves and feathers, and other naturally occurring protein containing materials, e.g. silk and saccharide-derived materials such as those derived from cellulose or cellulose derivatives, e.g. natural products such as cotton, and synthetic fibres such as polyamides.

Examples of classes of such reactive dyes which are well known in the art include dyes containing a vinyl sulphone group or vinyl sulphone precursor groups such as those commercially available from Dystar under the tradename Remazol.

There are many different types of commercially-available reactive dyes for dyeing cellulosic and polyamide-type substrates. However, a critical problem still facing the textile dye industry today is the significant level of dyestuff material which remains in the effluent waste water after the dyeing process is finished. The industry measure for this problem is known as dye-bath Exhaustion (E). A high Exhaustion value for a particular dye compound means that a low level of spent dye remains in the effluent after the dyeing process is complete, while a low Exhaustion value means that a high level of spent dye remains in the effluent. There is clearly a need therefore for new dye compounds which have higher Exhaustion Values compared with commercially available dye compounds, and which provide benefits in terms of reducing levels of spent dyestuff in effluent water.

As well as having a high Exhaustion Value, it is also important for a dye compound to have a high dye-fibre covalent Fixation Value (F). The Fixation Value (F) of a reactive dye compound is a measure of the extent of covalent bonding with the substrate based on the dye originally absorbed during the dyeing process. Thus 100% Fixation means that 100% of the absorbed dye covalently bonds to the substrate. Thus, there is clearly a need to provide dye compounds having increased Fixation Values. A high Fixation Value can result in a simplification of the post dyeing "soaping off process" traditionally associated with fiber reactive dye compounds. In particular, a high Fixation Value can result in a reduced time spent on the "soaping off process" together with a reduced cost. It has now been surprisingly found that a new class of fibre reactive dye compounds derived from vinyl sulphone dyes and their precursors such as chloroethylsulphone, sulphatoethylsulphone, phosphoethylsulphone, and other blocked ethyl sulphones as known in the art, comprising at least one chromophore group, at least one $SO_2C_2H_4$ group and at least one phosphonate substituent, exhibit significantly increased values of Exhaustion (E) and Fixation (F). These dyes can be used on a wide variety of substrates. They are particularly useful for cellulosic substrates, such as cotton, and show significant improvements in terms of decreasing the amount of spent dyestuff in effluent, increasing dye affinity to the substrate, increasing the efficiency of the dye-substrate covalent reaction, and simplifying the post dyeing "soaping off process" traditionally associated with reactive dyes. In addition, the compounds of the present invention provide significantly more intense dyeings, and can be used for both high and low temperature dyeing, hence reducing the cost of the dyeing process. Furthermore, the compounds of the present invention can be used together with specific chromophores for cellulose substrate dyeing leading to significantly reduced levels of salt needed for dyeing.

SUMMARY OF THE INVENTION

According to the present invention there is provided a reactive dye compound comprising:
(a) at least one chromophoric moiety
(b) at least one $SO_2C_2H_4$ group which is attached to the chromophoric moiety either directly via the sulphur atom of the $SO_2C_2H_4$ group or via a linking group L;
characterised in that at least one $SO_2C_2H_4$ group is substituted on its terminal carbon atom with at least one Y group wherein Y is a phosphonate or borate derivative. Preferably the phosphonate derivative is selected from phosphonates having the formula: —O—(P=O)(OH)R' wherein R' is any suitable nucleophilic moiety. The compounds of the present invention exhibit increased Exhaustion (E), Fixation (F) and Efficiency (T) values and provide improvements in terms of reducing spent dyestuff in effluent, increasing dye affinity to the substrate, increasing the efficiency of the dye-substrate covalent reaction, ability to carry out the long-liquor dyeing process at room temperature as well as at elevated temperatures, and simplifying the post dyeing "soaping off process" traditionally associated with fiber reactive dyes. In addition, the compounds of the present invention provide significantly more intense dyeings, i.e. greater colour intensity in the dyed substrate, without compromising levelness. Typical Exhaustion Values for the compounds and products herein are greater than 95%. Typical Fixation Values for the compounds and products herein are greater than 95%.

DETAILED DESCRIPTION OF THE INVENTION

As used herein the term "reactive dye" means a dye containing one or more reactive groups, capable of forming covalent bonds with the substrate to be dyed, or a dye which forms such a reactive group in situ.

As used herein the term "Exhaustion" in relation to reactive dyes means the percentage of dye which is transferred from a solution of the dye to the substrate to be treated at the end of the dyeing process, before rinsing and soaping. Thus 100% Exhaustion means that 100% of the dye is transferred from the dye solution to the substrate.

As used herein the term "Fixation" in relation to reactive dyes means the percentage of dye which covalently bonds with the substrate, based on the dye originally absorbed during the dyeing process. Thus 100% Fixation means that 100% of the dye absorbed is covalently bonded with the substrate.

The total efficiency of reactive dyes can be measured by their Efficiency Value (T) which can be calculated from the Exhaustion Value (E) and Fixation Value (F) using the following equation:

$$\% \ T = (F \times E)/100$$

The compounds of the present invention comprise a chromophoric moiety, at least one $SO_2C_2H_4$ group linked to the chromophore group either directly via the sulphur atom or via a linking group L and at least one Y substituent wherein the Y substituent is a phosphonate or borate derivative.

Chromophoric Moiety

The reactive dye compounds herein can comprise one or more chromophoric moieties (D). In reactive dye compounds comprising two or more chromophoric moieties these can be the same or different. Preferably the reactive dye compounds herein comprise from one to three chromophoric moieties, preferably one or two chromophoric moieties, preferably one.

Any chromophoric moieties suitable for use for dyeing substrates can be used in the present invention. The term chromophore as used herein means any photoactive compound and includes any coloured or non-coloured light absorbing species, e.g. fluorescent brighteners, UV absorbers, IR absorbing dyes.

Suitable chromophoric moieties for use in the dye compounds herein include the radicals of monoazo, disazo or polyazo dyes or of heavy metal complex azo dyes derived therefrom or of an anthraquinone, phthalocyanine, formazan, azomethine, dioxazine, phenazine, stilbene, triphenylmethane, xanthene, thioxanthene, nitroaryl, napbthoquinone, pyrenequinone or perylenetetracarbimide dye.

Suitable chromophoric moieties for use in the dye compounds herein include those disclosed in EP-A-0,735,107 (Ciba-Geigy), incorporated herein by reference, including the radicals described therein which contain substituents customary for organic dyes, such as sulphonate substituents which enhance the water solubility of the dye compound. Most preferred chromophoric D groups for use herein are polysulphonated azo chromophores such as those present in Procion (RTM) dyes commercially available from BASF, Drimalan (RTM) dyes commercially available from Clariant, Drimarene (RTM) dyes commercially available from Clariant and Levafix (RIM) and Remazol (RTM) dyes commercially available from Dystar.

Substituent Y

At least one of the $SO_2C_2H_4$ groups is substituted on the terminal carbon atom with at least one Y group wherein Y is a phosphonate or borate derivative.

Particularly preferred Y groups herein are phosphonate derivatives derived from polyphosphonate compounds, preferably having the formula: —O—(P=O)(OH)R' wherein R' is any suitable nucleophilic moiety.

Suitable R' groups for use herein are alkyl or aryl residues which contain at least one nucleophilic group. Preferably the R' groups herein are selected from the following groups each substituted with or containing at least one nucleophilic group: substituted or unsubstituted, straight chain or branched chain $C_1$–$C_8$ alkyl, substituted or unsubstituted straight chain or branched chain $C_2$–$C_8$ alkenyl having at least one olefinic group, substituted or unsubstituted, saturated or unsaturated or aromatic 3–9 atom mono cyclic carbocycle or substituted or unsubstituted, saturated or unsaturated or aromatic 7–17 polycyclic carbocycle, substituted or unsubstituted, saturated or unsaturated or aromatic 3–9 atom monocyclic heterocycle or substituted or unsubstituted, saturated or unsaturated or aromatic 7–17 atom polycyclic heterocycle, wherein said heterocycles each have one or more heteroatoms selected from O, N or S.

In the definition of R' above, where the term "substituted" is used such substitution may be with one or more substituents. Such substituents include, but are not limited to, those listed in C. Hansch and A. Leo, *Substituent Constants for Correlation Analysis in Chemistry and Biology* (1979), hereby incorporated by reference herein. Preferred substituents include, but are not limited to, alkyl, alkenyl, alkoxy, hydroxy, oxo, amino, aminoalkyl (e.g. aminomethyl, etc.), cyano, halo, carboxy, alkoxyacetyl (e.g. carboethoxy, etc.), thic, aryl, cycloalkyl, heteroaryl, beterocycloalkyl, (e.g. piperidinyl, morpholinyl, piperazinyl, pyrrolidinyl, etc.), imino, thioxo, hydroxyalkyl, aryloxy, arylalkyl, and combinations thereof.

Preferred R' groups for use herein include, but are not limited to, $CF_3$, $(CH_2)_nSH$, $(CH_2)_nNH_2$, $CH(CH_3)OH$, $C(OH)(CH_2COOH)_2$, $CH_2C(OH)(CO_2H)$ $CH_2COOH$, $(CH_2)_nNHR_1$, $CH_2NR_1R_2$, $CH_2NHNH_2$, $CH_2NHOH$, $CH_2SMe$, $CH(NH_2)(CH_2)_n(COOH)$, $CH(NH_2)CH_2SMe$, $CH(NH_2)CH_2SSCH_2CH(NH_2)COOH$, 2-aminophenyl, 2-hydroxynaphthyl, 2-pyrrolidyl, $CH_2SSCH_2CO_3^-$, $(CH_2)_n$—$SO_3^-$, $CH(NH_2)CH_2SO_3H$, $C_6H_4OH$, $C_6H_4COOH$, $C_6H_4NH_2$, $C_5H_4N$, $(CH_2)_nC_5H_4N$, $CH(R\#)NH_2$, $(CH_2)_n$—$SSO_3^-$, $(CH_2)_n$—S—S—$(CH_2)_n$, —C(OH)(H)C(OH)(H)COOH, —C(OH)(H)CH_2COOH, —C(OH)(COOH)$CH_2COOH$, $CH_2(H)(OH)COOH$, derivatives of hydroxy carboxylic acid polymerisation, e.g. in the case of lactic acid dimerisation R' is $CH(CH_3)O(CO)CH(CH_3)OH$, R' groups derived from peptide or polypeptide and attached to the heterocyclic group via their terminal carboxylic group, wherein $R_1$ and $R_2$ is independently selected from $C_1$–$C_4$ alkyl, wherein n is an integer in the range of 1 to 4 wherein within the same molecule n is not necessarily the same integer and where R# corresponds to an amino acid sidechain. For examples of such amino acids, cf. "Organic Chemistry" by Graham Solomons, 5$^{th}$ Edition, Wiley, New York, 1992, p1094–1095.

A preferred Y group herein is a group derived from aceto diphosphonic acid, namely —O—(PO)OH—C(OH)CH3—PO(OH)2.

Preferred reactive dye compounds of the present invention may be represented by the following formulae (I)

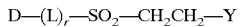

wherein:
D is a chromophore group;
r is 0 or 1, preferably 0,
L is a linking group selected from NH, $(CH_2)_n$, N—$(CH_2)_nN$, —$(CH_2)_n$—N, NR (R is $C_1$–$C_4$ alkyl)

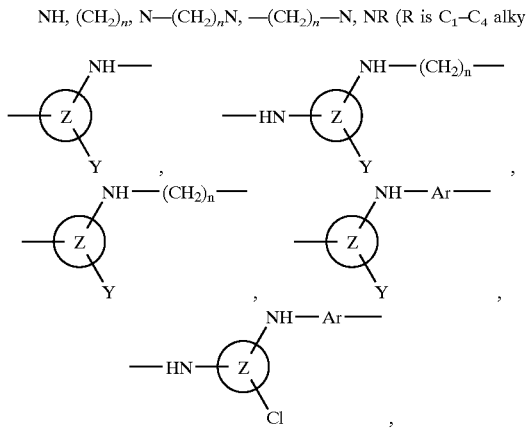

wherein Ar is an aryl group, preferably benzene, Y is as defined above, Z is a nitrogen-containing heterocycle as defined below;
and salts thereof.

Suitable starting dye compounds for use herein are vinyl sulphone dyes, such as for example, Remazol Red RB, Remazol Yellow 3RS, Remazol Turquoise Blue G, dyes containing both vinyl sulphone and nitrogen-containing heterocycle functional groups, such as for example, Cibacron Red C2G, Cibacron Yellow C2R and Cibacron Blue CR, dyes containing both vinyl sulphone and nitrogen-containing heterocycle functional groups, and an additional benzene group as part of the L linking group, such as for example, Sumifix Supra Red 2BF and Sumifix Supra Yellow 3RF. These starting dyes are reacted with compounds containing a suitable Y group, such as for example, aceto diphosphonic acid.

Nitrogen-containing Heterocycle (Z)

Suitable nitrogen containing heterocycles for use herein include monocyclic, bicyclic or polycyclic, unsaturated heterocycles containing at least one nitrogen heteroatom. When monocyclic rings are used, they are preferably selected from unsaturated rings having from about 3 to about 7 ring atoms, especially 5 or 6 ring atoms, comprising from about 1 to about 3 nitrogen heteroatoms, preferably 2 or 3 nitrogen heteroatoms. When bicyclic heterocycles are used, they preferably comprise an unsaturated nitrogen containing heterocycle having 3 to 7 ring atoms, preferably an unsaturated nitrogen containing heterocycle having 5 or 6 ring atoms comprising 1 or 2 nitrogen atoms, fused to a 5 to 7 membered carbocycle preferably a 6-membered unsaturated carbocycle. When bicyclic heterocycles are used, the oxy carbonyl substituents are preferably attached to the nitrogen containing heterocyclic ring.

Preferred for use herein are 5 or 6 membered unsaturated nitrogen containing monocyclic heterocyclic rings comprising 2 or 3 nitrogen heteroatoms or bicyclic rings containing a 5 or 6 membered unsaturated heterocyclic ring containing 2 nitrogen heteroatoms fused to a 6 membered unsaturated carbocycle.

Examples of suitable heterocycles for use herein include, but are not necessarily limited to triazine, pyrimidine, quinoxaline, pyrimidinone, phthalazine, pyridazone and pyrazine. Preferred for use in the compounds herein are triazine, pyrimidine and quinoxaline.

The present invention further relates to processes for the preparation of dyes herein. In general, dyes herein are prepared by a process which comprises the steps of reacting a first starting material (preferably one mole) with a second starting material (preferably one mole), the first starting material comprising at least one chromophore, at least one $SO_2C_2H_4$ group which is attached to the chromophore group either directly via the sulphur atom of the $SO_2C_2H_4$ group or via a linking group (for example a Remazol dye), the second starting material being a compound containing a suitable Y group, such as for example aceto diphosphonic acid. It is preferable that the reaction is carried out at a pH of between 2 to 8, preferably 3 to 5 and over several hours, preferably 1 to 5 hours, more preferably 2–3 hours.

Compounds herein having the formula (I) are prepared by reacting a first starting material (preferably one mole) with a second starting material (preferably one mole), the first starting material containing a D—(L)$_r$—SO$_2$—CH$_2$CH$_2$— group as defined above (for example a Remazol dye, such as Remazol Brill Blue RS commercially available from Dystar), the second starting material being compound containing a Y group such as aceto diphosphonic acid. It is preferable that the reaction is carried out over several hours (2–5 hours). It is also important to add the diphosphonic acid dropwise over several hours, preferably from about 1 to about 5 hours, preferably from about 1 to about 3 hours.

Depending upon the reaction conditions (for example, amounts of each starting material, form of each starting material), mixtures of different dye compounds may be obtained in the final product, such mixtures containing for example, products formed from further substitution reactions , structural isomers and the like.

Hence according to another aspect of the present invention there is provided the product obtainable by any of the processes detailed herein.

In particular, there is provided a product obtainable by a process wherein the process comprises the steps of reacting a first starting material (preferably one mole) with a second starting material (preferably one mole), the first starting material comprising at least one chromophore, at least one $SO_2C_2H_4$ which is attached to the chromophore group either directly via the sulphur atom of the $SO_2C_2H_4$ group or via a linking group L (for example a Remazol dye), the second starting material being a compound containing a suitable Y group, such as for example, aceto diphosphonic acid. It is preferable that the reaction is carried out at a pH of between 2 to 8, preferably 3 to 5 and over several hours, preferably 1 to 5 hours, more preferably 2–3 hours.

The dye compounds herein are suitable for dyeing and printing a wide variety of substrates, such as silk, leather, wool, polyamide fibers and polyurethanes, keratin fibres such as hair, and in particular cellulosic materials, such as the natural cellulose fibres, cotton, linen, hemp and the like, paper, and also cellulose itself and regenerated cellulose, and hydroxyl-containing fibres contained in blend fabrics, for example blends of cotton with polyester or polyamide fibres.

The dye compounds of the present invention can be applied and fixed to the substrate in various ways, in particular in the form of a solid mixture, aqueous dye solutions and printing pastes. Thus according to the present invention there is provided a dye composition comprising one or more of the dye compounds described herein together with any carrier material suitable for use in a dye composition.

Preferred dye compositions herein comprise an acidic buffer material. Any acidic buffer suitable for use in dye compositions can be used herein. An example of a suitable buffer is a mixed phosphate buffer.

When the dye composition herein is in the form of a paste a preferred ingredient is a thickening agent. Any suitable thickening agents suitable for use in reactive dye compositions can be used herein.

When the dye composition is in the form of an aqueous solution or aqueous gel/paste, the dye composition preferably has a pH of from about 2 to about 8, more preferably from 2 to 5, especially from 2 to 3.

The dyeing and printing processes which can be used with the dyes herein are conventional processes which are well known and which have been widely described in the technical and patent literature. The dye compounds herein are suitable for dyeing both by the exhaust method (long liquor) and also by the pad-dyeing method, whereby the goods are impregnated with aqueous, salt-containing or salt-free dye solutions and the dye is fixed after an alkali treatment or in the presence of alkali, if appropriate with the application of heat. The dye compounds herein are also suitable for the cold pad-batch method, after which the dye together with the alkali is applied using a pad-mangle, the fabric batched on a roll. A dye-fibre covalent reaction occurs over several hours of storage at room temperature. Alternatively, padded or printed goods may be fixed by a steaming process using steam temperatures between 100–130° C. After fixing, the dyeings or prints are thoroughly rinsed with cold and hot water, if appropriate with the addition of an agent acting as a dispersant and promoting the diffusion of the non-fixed portions. Thus in accordance with another aspect of the present invention there is provided a use of the reactive dyes of the present invention for dyeing and printing substrates such as cotton, wool, nylon, silk, keratin, hair, leather, paper and the like. The compounds herein can be used in methods of dyeing all of the substrates listed above by applying an aqueous solution of one or more of the reactive dyes of the present invention to the substrate to be dyed under suitable conditions of pH and temperature.

The following examples serve to illustrate the compounds and compositions of the present invention.

The starting compounds and components given in the examples below can be used in the form of the free acid or in the form of their salts. As discussed above, the products obtained in the examples below may comprise mixtures of different dye compounds. In the Examples below all the starting materials are commercially available. In particular the Remazol dyes are available from Dystar Textilfarben, GmbH & Co., Deutschland KG, BU-RIF & E, Werk Hoechst, Building G834, D-65926 Frankfurt am Main, Germany, and the Sumifix dyes are available from Sumitomo Chemical Co. Ltd., Mar. 1, 1998, Kasugade-naka Konohana-ku, Osaka 554, Japan. The Cibacron dyes are available from Ciba, Basle

EXAMPLE 1

The reactive dye compound is prepared as follows. 0.005 moles of Remazol Brill Blue R Special dye is dissolved in 150 ml of distilled water in a 400 ml flask. The temperature of the reaction system is adjusted and maintained at 20° C. The pH of the starting dye solution is adjusted to 5–5.5 using solid sodium carbonate. 0.005 moles of aceto diphosphonic acid is dissolved in 50 ml of distilled water. The pH of this aceto diphosphonic acid solution is adjusted to around 4.5. The aceto diphosphonic acid solution is slowly added into the solution of Remazol Brill Blue R Special dye. The rate of addition is such that the addition takes around 2 hours to complete. During the process of addition the temperature of the reaction system is maintained at 20° C. After addition of the phosphonate compound solution is complete, the reaction is allowed to continue for 5–6 hours. The endpoint of the reaction is indicated by the pH of the reaction system remaining constant for more than 5 minutes. At this point the final dye is obtained. Using 6N HCl, the pH of the system is then reduced to below 2.5 to terminate the reaction. KSCN (about 25% of the total solution) is then added to the reaction mixture in order to precipitate the dye product. Filtration using Whatman filter paper is then carried out. The precipitate is then washed with acetone for 5–6 times (about 50 ml of acetone used each time) to obtain the final dye product in fine powder form of deep blue colour.

The compounds prepared according to Example 1 and at standard depths has a high Exhaustion Value, a high Fixation Value, particularly on cellulosic substrates such as cotton, and shows significant improvements in terms of reducing spent dyestuff in effluent, increasing dye affinity to the substrate, increasing the dye-substrate covalent bonding, increasing the ability to dye substrates at room temperature, decreasing the amount of dye that is removed during the post dyeing "soaping off process" and therefore simplifying the post dyeing "soaping off process" traditionally associated with dyeing cotton with fibre reactive dyes and reduction of staining of adjacent white fabrics. In addition, the compound prepared above provides more intense dyeings and requires less levels of salt for dyeing cotton substrates. These advantages can be demonstrated by the following Examples 2 and 3.

EXAMPLE 2

The dye product prepared according to Example 1 can be used to dye cotton using the dyeing procedures detailed below. After the cotton dyeing procedure has been carried out a soaping-off process can also be carried out on the cotton fibre.

Cotton Dyeing Procedure

An aqueous dye solution is prepared containing a dye compound according to Example 1. The dye solution contains 1% on mass of fibre of dye, 80 g/L $Na_2SO_4$ and 5% on mass of fibre of sodium acetate. The cotton fabrics are soaked in water and then the cotton fabrics are dyed in the above dye-bath at pH 7 at 50° C. for 15 minutes. The dyed cotton fabric is then fixed in the dye-bath at pH 11.5 with addition of 30g/L of trisodium phosphate and dyeing continued at 50° C. for 45 minutes. The dyed fabric is rinsed with water.

In the above dyeing procedure the dye bath for each dye compound is almost totally exhausted (i.e. only slight colour in the dye bath after dyeing), indicating that the dye product prepared according to Example 1 has a high Exhaustion Value (97.31%). The Exhaustion Value can be obtained by comparing the photo-absorption of the dyebath liquid before and after dyeing.

Soaping-off Process

A soaping off process can then be carried out by washing the dyed fabrics with an aqueous solution of Sandozine NIE (2 g/L) (available from Clariant (Switzerland) Ltd., R&D Dyestuffs, Post Box, Building 88/1007, CH-4002 Basel) at 100° C. for 30 minutes. In the above soaping-off process hardly any colour was removed from the fabric, resulting in an almost colourless soaping liquid, indicating that the dye product prepared according to Example 1 has a high degree of dye-fibre covalent bonding and a high Fixation Value (typically>95%).

The E, F and T values of the dyes according to the present invention are typically higher than many of the commercially available starting materials. In particular, the F and T values of the dyes according to the present invention are significantly higher than those of the commercially available starting materials.

Co3 (International Standards Oranisation) Wash Fastness Test

The dyed fabrics are washed with an aqueous solution containing ECE Reference Detergent (5 g/ml) and sodium carbonate (2 g/ml) at 60° C. for 30 minutes. In the above wash fastness test, no noticeable colour was removed from the cotton fibre and no staining of the white adjacent fibres occurred (using Multiple Fibre adjacent strip supplied by the Society of Dyes and Colourists, Bradford, UK).

EXAMPLE 4

The dye product prepared according to Example 1 can be used to dye nylon or wool using the dyeing procedures detailed below. After the nylon/wool dyeing procedure has been carried out a wash-test procedure can be carried out on the dyed fabric to test the wash-fastness of the dye compounds.

Wool/Nylon Dyeing Procedure

The wool/nylon fabric is soaked in a 2% w/w Alcohol-O (40% w/w sodium-d-isooctylsulpho-succinate commercially available from Allied Colloids) solution. The fabric is then dyed for 1 hour at 100° C. and pH 3.5 in a dye-bath containing the following compositions: 1.2% on mass of fibre of dye prepared according to Example 1, 5% on mass of fibre of sodium acetate, 1% Albegal B (commercially available from Ciba). The dyed wool/nylon fabric was then rinsed with water.

In the above procedure intense dyeings are provided for the dye product prepared according to Example 1.

Co2 (ISO) Wash Fastness Test Procedure for Wool/Nylon Fabrics

The dyed wool/nylon fabric is washed in an aqueous solution containing 5 g/L of ECE Reference Detergent

What is claimed is:

1. A reactive dye compound comprising:

(a) at least one chromophore moiety (b) at least one $SO_2C_2H_4$ group which is attached to the chromophoric moiety either directly via the sulphur atom of the $SO_2C_2H_4$ group or via a linking group L; wherein L is a linking group selected from:

NH, $(CH_2)_n$, N—$(CH_2)_n$N, —$(CH_2)_n$—N, NR (R is C1–C4 alkyl)

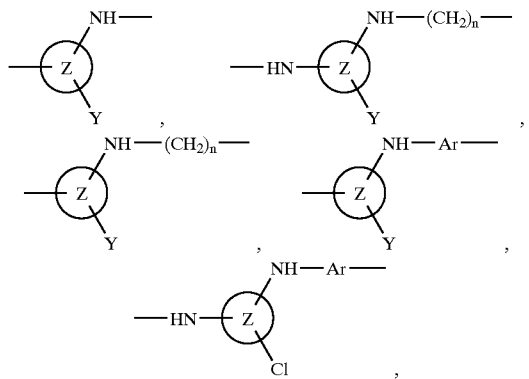

wherein Ar is an aryl group, preferably benzene;

wherein Y is a phosphonate or borate derivative, under the proviso that if the phosphonate derivative is selected from phosphonates having the formula:

—O—(P=O)(OH)R' wherein R' is any suitable nucleophilic moiety, R' is not OH;

wherein Z is a nitrogen-containing heterocycle;

wherein n is an integer of from 1 to 4;

wherein the dye compound is further characterized in that at least one $SO_2C_2H_4$ group is substituted on its terminal carbon atom with at least one Y group; and salts thereof.

2. A reactive dye compound according to claim 1 wherein Y is derived from aceto phosphonic acid.

3. A reactive dye compound having the formula (I):

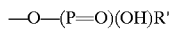
    D—(L)$_r$—SO$_2$—CH$_2$CH$_2$—Y wherein:

D is a chromophore group;

r is 0 or 1, preferably 0,

L is a linking group selected from:

NH,$(CH_2)_n$, N—$(CH_2)_n$N, —$(CH_2)_n$—N, NR (R is C1–C4 alkyl)

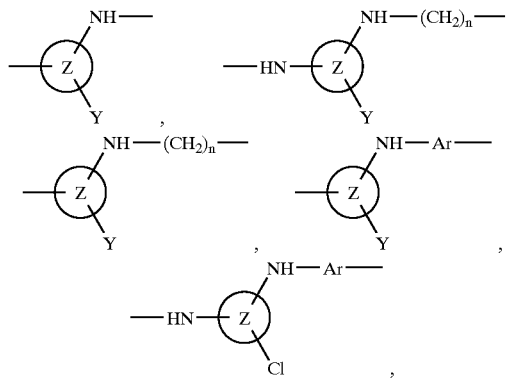

wherein Ar is an aryl group, preferably benzene;

wherein Y is a phosphonate or borate derivative, under the proviso that if the phosphonate derivative is selected from phosphonates having the formula: —O—(P=O)(OH)R' wherein R' is any suitable nucleophilic moiety, R' is not OH; wherein Z is a nitrogen-containing heterocycle; wherein n is an integer of from 1 to 4;

and salts thereof.

4. A reactive dye compound according to claim 3 wherein Z is selected from triazine, pyrimidine, quinoxaline, pyrimidinone, phthalazine, pyridazone and pyrazine.

5. A reactive dye compound according to claim 3 wherein r is 0.

6. A method of dyeing a cellulosic substrate, comprising contacting the cellulosic substrate with a compound according to claim 1.

7. A method of dyeing wool, comprising contacting the wool with a compound according to claim 1.

8. A method of dyeing a polyamide substrate, comprising contacting the polyamide substrate with a compound according to claim 1.

9. A method of dyeing silk, comprising contacting the silk with a compound according to claim 1.

10. A method of dyeing keratin, comprising contacting the keratin with a compound according to claim 1.

11. A method of dyeing leather, comprising contacting the leather with a compound according to claim 1.

12. A dye composition comprising the compound of claim 1.

13. A dye composition according to claim 12 wherein the composition is in the form of a solid mixture and further comprises an acid buffer.

14. A dye composition according to claim 12 wherein the composition is in the form of a liquid and further comprises water and an acid buffer, wherein the dye composition preferably has a pH from about 2 to about 8.

15. A dye composition according to claim 12 wherein the composition is in the form of a paste and further comprises water, thickening agent and an acid buffer, wherein the dye composition preferably has a pH from about 2 to about 8.

16. A dye composition according to claim 13 wherein the acid buffer is selected from citric acid, malic acid, fumaric acid and maleic acid, and mixtures thereof.

17. A dye composition according to claim 14 wherein the pH is from about 2 to about 3.

18. A dye composition according to claim 14 wherein the acid buffer is selected from citric acid, malic acid, fumaric acid and maleic acid, and mixtures thereof.

19. A dye composition according to claim 15 wherein the acid buffer is selected from citric acid, malic acid, fumaric acid and maleic acid, and mixtures thereof.

20. A dye composition according to claim 15 wherein the pH is from about 2 to about 3.

* * * * *